Figure 1:
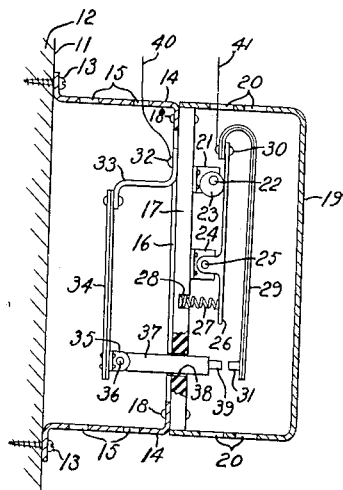

Jan. 31, 1956

M. C. RICHARDSON 2,733,315

COLD WALL THERMOSTAT

Filed June 16, 1953

INVENTOR

Mark Richardson

United States Patent Office 2,733,315
Patented Jan. 31, 1956

2,733,315

COLD WALL THERMOSTAT

Max C. Richardson, Portland, Oreg., assignor to Iron Fireman Manufacturing Company, Portland, Oreg.

Application June 16, 1953, Serial No. 361,893

10 Claims. (Cl. 200—138)

This invention relates generally to thermostats adapted for mounting in a space to be heated for the purpose of controlling the heat supplied to the space.

More particularly this invention relates to an improved thermostat in which the heat supplied to the space is controlled by a combination of the air temperature in the space and the inside wall temperature of an enclosing wall the outside of which is exposed to a variable temperature condition.

Attention is called to my prior U. S. Patent No. 2,464,346, issued March 15, 1949, on an Auxiliary Space Thermostat over which the present thermostat is an improvement since the present thermostat combines in one place the satisfactory means for controlling the temperature of a space which required two thermostats in my previous system.

It is well known that in the control of automatic heating plants for residences thermostats are used to start and stop the supply of heat. The temperature sensing element of such an instrument is usually a strip of bimetal formed as desired by the particular manufacturer of the thermostat and having the function of opening and closing a control circuit capable of stopping or starting the supply of heat to the space to be heated.

Customarily the thermostat is located about four or five feet above the floor on an inside wall of a frequently used living room of the residence. The temperature sensitive bimetal element is mounted in a well ventilated enclosing case of such dimensions that the bimetal element will be about an inch from the wall where the room air will circulate freely around it. Thus even though the wall on which the thermostat is mounted usually has such mass and heat storage capacity as to tend to remain at an average temperature the bimetal will be influenced by the air rather than the wall and will control within reasonable limits the air temperature at its location.

However the air temperature along the inside wall is a poor indication of comfort conditions in the living space since this location lags in feeling the heat loss from the house and also lags in feeling the heat input to the house. Even though this is so thermostats yet are generally located on the inside walls and various efforts have been made to design the thermostat to overcome the bad effects of its location.

The most commonly used thermostat modification has been the introduction into the thermostat of electric heat whenever the heating plant is running. This scheme tends to introduce a timing effect into the operation of the heating plant and if enough heating effect is added to the thermostat the operation will tend more towards being cyclic than thermostatic. Usually however, only enough thermostat heat is added to cause the heating plant to stop before the thermotsat setting temperature is reached by the ambient air and thus to minimize the disagreeable temperature overshoot caused by the stored heat of the heating system at the time the thermostat is satisfied.

The slow development of thermostatic controls for house heating is probably due more to the lack of understanding of comfort requirements by the heating industry than it is to lack of interest by the control manufacturers. It is not generally appreciated that only after excessive over chilling is it comfortable for the human body to have net heat added to it from the outside. The body is itself a heater and except under abnormal conditions must lose heat constantly in well known quantities or a fever will be developed. The comfort problem is the problem of control of heat loss from the body and not of adding heat to it.

The body loses heat by radiation, convection, and conduction. Normally the average person in customary dress in a house, has about an equal net heat loss from radiation as he has from both convection and conduction. Heat loss from convection and conduction may be thought of as heat loss to the ambient air while heat loss by radiation is the net of the heat radiated by the surrounding surfaces, like walls and furniture, to the body and the heat radiated to the surrounding surfaces by the body. Because of these natural phenomena body comfort in an enclosed space is determined half by the mean surface temperature of surfaces surrounding the body and half by the ambient air temperature. The old idea that an air temperature of 70° F. was a comfortable temperature was a good idea provided the surrounding surfaces also had a mean temperature of 70° F. However a better way to express the comfort requirement is to say that the sum of the air temperature plus the mean temperature of the surrounding surfaces should be 140° F. This expression is quite satisfactory over the range 80° air temperature with 60° surrounding surface mean temperature to 60° air temperature with 80° surrounding surface temperature.

When the outside temperature is below 70° and the inside temperature is 70° heat will be lost from the space by conduction through the enclosing walls of the space and by the loss of heated air from the space. Since the outside temperature is the primary reason for heat loss various schemes have been devised to attempt to provide a comfortable inside temperature by using the outside temperature as a controlling variable. While this might be done after sufficient experimentation with a particular installation the scheme fails in general use because of the varying constructions and exposures experienced in practice. In a massive and heavy walled building it may be hours before an outside temperature drop would be sufficiently felt inside to require additional heat while in a frame constructed home it might be only 15 minutes or even less on the windward side of the house.

In any case the temperature of the inside surface of the outside wall not only is a direct indication of what is happening to the mean surface temperature of the space but is the only indication of outside temperature required to establish comfort conditions.

It is therefore a primary object of this invention to provide a thermostat for the control of heat to be supplied to a space which will nominally control the amount of heat supplied in accordance with the setting of a sensing element in the ambient air but which will have its operating temperature varied from its setting temperature as a function of the inside temperature of the outside wall.

It is a second object to provide as a single complete device to be mounted on the inside surface of an outside wall of a residence a cold wall thermostat adapted to control the heat supply to the residence as a function of the sum of the mean surface temperature of the room in which the thermostat is placed and the mean air temperature of the room.

It is a third object to provide in a single thermostat adapted to be mounted on the inside surface of an outside wall of a space to be heated a first bimetal element freely exposed to the ambient air at its location and a second bimetal element exposed to the radiant effect of the wall on which the thermostat is mounted together with means for causing the second bimetal to modify the operating characteristic of the first bimetal to control the heat supplied to the space as a function of the temperature of the air in the space and the temperature of the inside of the outside wall.

It is a fourth object to provide such a thermostat in which a first temperature sensitive element exposed to the room air and a second temperature sensitive element exposed to the radiation effect of a cold wall combine to vary the room air temperature at which the thermostat starts and stops the flow of heat to the room.

It is a fifth object to provide such a thermostat in which heat is supplied directly by an electric heater to the air temperature sensitive element when heat is being supplied to the room.

It is a sixth object to provide such a thermostat in which heat is supplied directly by an electric heater to the wall radiation sensitive element when heat is being supplied to the room.

It is a seventh object to provide such a thermostat in which the wall radiation sensitive element is adapted to modify the heating characteristics of the electric heater which supplies heat to the air temperature sensitive element.

How these and other objects are provided is explained in the following description referring to the attached drawing in which Fig. 1 is a view in side elevation of one form of the thermostat of this invention with the enclosing case cut away to show the internal parts.

Figs. 2, 3, 4, and 5 are schematic views of other species of the thermostat of this invention with the enclosing case omitted for simplicity of description.

Like numerals of reference refer to like parts in the several figures of the drawing.

Referring now to the drawing there is shown in Fig. 1 the inside surface 11 of a building wall 12 the outside of which is exposed to the weather. Secured to wall 12, as by screws 13, is the sub base enclosure 14 well ventilated by perforations 15, top and bottom. Covering the large opening 16 in the face of sub base 14 is electrical and thermally insulating plate member 17 secured to sub base 14 by rivets 18. Front cover 19 well ventilated, top and bottom, by perforations 20 fits snugly about the periphery of plate 17 and is secured thereto by any desired means.

Frictionally rotatably carried in bracket 21, secured as shown to plate 17, is adjusting shaft 22 to which eccentric adjusting cam 23 is secured. Hinge bracket 24, secured as shown to plate 17, carries hinge pin 25 on which is pivoted as shown adjusting lever 26 resiliently pressed against the surface of cam 23 by compression spring 27, located by hole 28 in plate 17. Bimetal blade 29 secured to lever 26 by rivet 30 carries at its other end thermostat moving contact 31.

Secured at one end to the back of plate 17 by pin 32 is bracket 33 to the other end of which is riveted, as shown, one end of bimetal thermostat blade 34 the other end of which carries hinge bracket 35 to which is pivotably secured by hinge pin 36 one end of conducting bar 37 which guided in hole 38 in plate 17 carries thermostat contact 39 at its other end.

Thermostat blade 29 is arranged to have its lower end move to the left as it gets colder while thermostat blade 34 is arranged to have its lower end move to the right as it gets colder. The circuit through the thermostat is from lead 40 to pin 32, bracket 33, blade 34, hinge 35, 36, bar 37, contacts 39, 31, blade 29 to rivet 30 and lead 41. Thus the thermostat as described becomes a switch adapted to be inserted in a control circuit adapted to control the supply of heat to the space in which the thermostat is located.

Usually the part of the control circuit into which the thermostat is inserted in series includes the low voltage winding of a transformer having a low voltage winding rating of about 25 volts and an operating coil for a relay, the coil also being rated at about 25 volts. The usual circuit current rating will be about one half ampere.

The thermostat shown in Fig. 1 would have adjusting shaft carried out through a notch in the side of cover 19 and carry a dial properly calibrated to indicate the setting of the thermostat. Calibration would be set with blades 34 and 29 at 70 degrees and the dial set at 70 degrees. Then in the use the thermostat setting on the dial would indicate the air temperature desired if the wall temperature were 70 degrees but the actual thermostat operating temperature of the room air would be modified as an inverse function of the wall temperature in accordance the temperature control plan discussed above.

The thermostat of this invention can be heat anticipated or heat accelerated in accordance with the character of the heat supply available and Figs. 2 to 5 inclusive illustrate several ways that this can be done. The scheme employed in Fig. 4 has been found satisfactory and could be called the preferred arrangement. However the figures will be described in numerical order, it being understood that the figures have been simplified to show not a complete thermostat but only the feature desired to be particularly illustrated.

Figure 2:
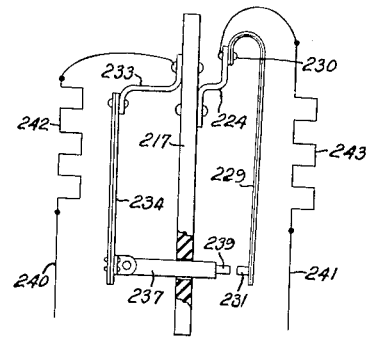

In Fig. 2 it is seen that resistance heaters 242 and 243 have been added in series with bracket 233, blade 234, bar 237, contacts 239, 231, blade 229, and rivet 230 in the internal circuit of the thermostat. In this case when this thermostat is open circuited the chilling of both blades will combine to start the supply of heat to the space and after starting heater 242 will cause the thermostat to anticipate the warming of the walls while heater 243 will cause the thermostat to anticipate the warming of the room air. The thermostat can be designed to use either or both heaters 242 or 243 and of course either can be made adjustable. It is understood that these heaters are of low resistance of the order of two thirds of an ohm and with a current of one half ampere would have a voltage drop across each of them of about one third volt and each would have a heat output of about one sixth watt. It is plain therefore that the heaters would have no appreciable effect on the operation of the other parts of the control circuit since both heaters together would require only two thirds volt of the 25 volts supplied by the transformer.

For practical reasons it is generally desirable to provide a thermostat with a fixed contact, adjustable for calibration purposes, and with which is associated a permanent magnet system for greater reliability of contact operation. For this reason the species schemes of Figs. 3, 4, and 5 of my invention are fixed contact forms.

Figure 3:
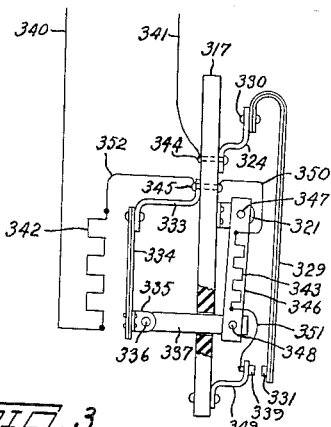

In Fig. 3 it should be noted that adjusting bar 337 is made of insulating material as is also adjusting lever 346 hinged at one end to bar 337 by pin 348 and hinged by pin 347 at the other end to bracket 321 secured to plate 317 as shown. The circuit through the thermostat of Fig. 3 is from lead 340 through heater 342, wire 352, rivet 345, wire 350, heater 343 carried on lever 346, wire 351, bracket 349, contacts 339, 331, blade 329, rivet 330, bracket 324, and rivet 344 to lead 341. In the Fig. 3 device, when the thermostat contacts close and start the heat supply to the space, heaters 342 and 343 are energized and start supplying a small amount of heat to blades 334 and 329 respectively.

In the device of Fig. 3, both blades 334 and 329 are arranged to move their lower ends to the right on an increase in temperature and to the left on a decrease in temperature. Thus when the thermostat contacts close heater 343 begins to supply heat to blade 329 to anticipate the effect on the space of the somewhat lagging heat supply and heater 342 supplies heat to blade 334 which gradually flexes to the right and thus moves heater 343 closer to blade 329 and thus to accentuate the effect of heater 343 on blade 329 as time advances. In this case it is seen that the colder the wall and the more heat loss therethrough the more heat is required to be delivered to the space and the anticipating effect of heater 343 on blade 329 will be least while if the wall is warmer due to less heat loss therethrough heater 343 will be closer to blade 329 and have a great heat anticipation effect thereon.

Figure 4:
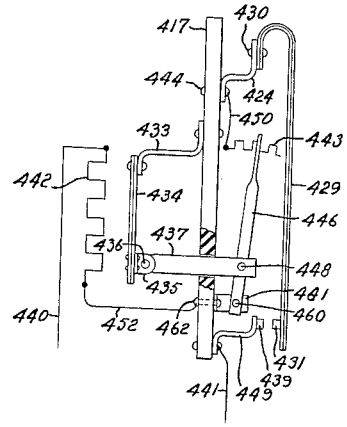

In the device shown in Fig. 4 heater 443 for blade 429 is a variable resistor, fixed in position, and variable in effective circuit resistance by conducting slider blade 446 pivotably hinged to plate 417 by pivot pin 460, bracket 461, and rivet 462. Conducting blade 446 is positioned by bimetal blade 434 to which it is linked by pivot pin 448, insulating bar 437, pivot pin 436 and bracket 435. The circuit through the device of Fig. 4 is from lead 440, through heater 442, wire 452, rivet 462, bracket 461, pin 460, slider 446, resistor 443, wire 450, rivet 444, bracket 424, rivet 430, blade 429, contacts 431, 439 and bracket 49, to lead 441. The effective action of the device of Fig. 4 is the same as that of Fig. 3 except that in Fig. 4 the heating of blade 434 and its movement to the right increases the resistance and therefore the heat supplied to blade 429 by heater 443, while in the device of Fig. 3 the movement of blade 334 to the right increases the effectiveness of heat transfer from resistor 343 to blade 329.

Figure 5:
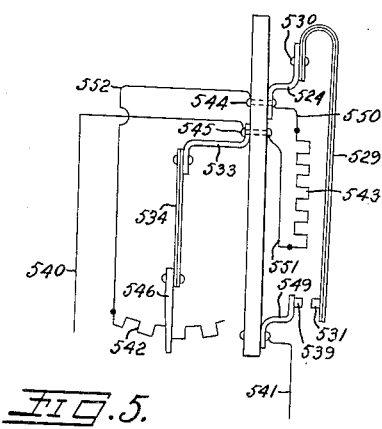

In the device shown in Fig. 5 it is to be noted that heater 543 associated with bimetal blade 529 is in parallel with the variable resistor 542 associated with bimetal blade 534 and that the two heaters in parallel are in series in the control circuit through the thermostat. Also as above explained the relatively small resistance of the internal circuit of the thermostat as compared with the other circuit elements in series with the thermostat is such that the circuit total current remains at approximately one half ampere. In the thermostat of Fig. 5 the one-half ampere divides between resistor 543 and resistor 542 in proportions determined by the position of conducting slider tip 546 of blade 534 as it moves along resistor 542.

The circuit through the thermostat of Fig. 5 is from lead 540 to rivet 545, from rivet 545 to rivet 544 either through wire 551, heater 543 and wire 550, or through bracket 533, blade 534, slider 546, resistor 542 and wire 552, then on from rivet 544 through bracket 524, rivet 530, blade 529, contacts 531, 539 and bracket 549 to lead 541.

In operation, when the Fig. 5 thermostat contacts close to start the supply of heat to the space current traverses both heaters 543 and 542 and if the wall surface is relatively cold slider 546 will be near the left end of resistor 542 thus leaving only a small part of resistor 542 in parallel with resistor 543 and thus the greater part of the total resistor heat will be applied to the wall space including blade 534. As the heat supplied to the space by the heating means under the control of the thermostat gradually becomes effective to heat the space around the thermostat, this heat added to the heat of resistor 542 causes slider 546 to gradually move to the right and thus reduce the heat given off by heater 542 and increase the heat given off by heater 543 to influence blade 529 in anticipation of the supply of all heat requirements of the room being satisfied.

In the drawing I have illustrated and have here described five species of my cold wall thermostat and yet other simple variations of my device will come to the minds of practitioners in this art. For instance I have found that in a special case where the use of thermostat of Fig. 4 was indicated it was thought desirable to bring a third control wire from the control circuit transformer and connect heater 442 to supply heat to the wall space at all times whether the thermostat contacts were closed or not. In this case lead 440 was connected to the lower end of resistor 442 and the upper end of resistor 442 was connected to a circuit point having substantially the circuit transformer voltage differential in voltage from lead 440. Of course heater 442 was changed to one having substantially greater resistance.

Having thus explained the need for and the objects of by invention and having described the construction and explained the use of several forms of my invention, I claim:

1. An improved thermostat adapted to be mounted on the inside surface of an outside wall of a space to be heated whereby the heat supplied to the space will be controlled by said thermostat as a function of the combination of the air temperature in said space and the temperature of the inside surface of said outside wall, said thermostat comprising an insulating barrier substantially parallel to said inside surface of said outside wall and spaced therefrom, a first temperature responsive element on the side of said barrier away from said wall and exposed to the air in said space, a second temperature responsive element between said barrier and said wall and adapted to exchange radiant energy with the inside surface of said wall, a first control circuit contact adapted to be positioned by said first temperature responsive element and a second control circuit contact adapted to be positioned by said second temperature responsive element, whereby the closure of said contacts one on the other to start a supply of heat to said space will be determined by both the ambient air temperature of the said space and the inside temperature of said outside wall.

2. The device of claim 1 including means adapted to supply auxiliary heat to at least one of said temperature responsive elements when said contacts are closed.

3. The device of claim 1 including means adapted to supply auxiliary heat to at least one of said temperature responsive elements in an amount varying as a function of the position of said second temperature responsive element.

4. An improved thermostat adapted to be mounted on the inside surface of an outside wall of a space to be heated whereby the heat supplied to the space will be controlled by said thermostat as a function of the combination of the inside air temperature and the temperature of said inside surface of said outside wall, said thermostat comprising an insulating barrier substantially parallel to said inside surface of said outside wall and spaced therefrom, a first temperature responsive element on the side of said barrier away from said wall and freely exposed to the ambient air in said space, a second temperature responsive element between said barrier and said wall and adapted to exchange radiant energy with the inside surface of said wall, a pair of circuit closing contacts for said thermostat, means adapted manually to position said contacts to close at a desired temperature of said ambient air in said space when said inside surface of said wall is at a specified temperature, and means adapted automatically to vary the temperature of said ambient air at which said contacts will close as a function of the temperature of the inside surfaces of said outside wall.

5. An improved thermostat adapted to be mounted on the inside surface of an outside wall of a space to be heated whereby the heat supplied to the space will be controlled by said thermostat as a combined function of the inside air temperature and the temperature of the inside surface of said outside wall, said thermostat comprising an insulating barrier substantially parallel to said inside surface of said outside wall and spaced therefrom, a first temperature responsive element on the side of said barrier away from said wall and exposed to the air in said space, a second temperature responsive element between said barrier and said wall and adapted to exchange radiant heat with the inside surface of said outside wall, thermostat contact means adapted to be closed by said first temperature responsive means at a first predetermined temperature condition of said space and to be opened by said first temperature responsive means at a second predetermined temperature, and means adapted to cooperate with said second temperature responsive element to vary said second predetermined temperature as a function of the temperature of said second temperature responsive element.

6. The thermostat of claim 5 in which said means adapted to cooperate with said second temperature responsive element to vary said second predetermined temperature includes an electric heater adapted to be energized when said thermostat contact means are closed.

7. The thermostat of claim 6 in which said electric heater is adjacent said first temperature responsive means.

8. The thermostat of claim 7 in which said means adapted to cooperate with said second temperature responsive element to vary said second predetermined temperature includes means adapted to cooperate with said second temperature responsive element to vary the heating effect of said electric heater on said first temperature responsive means as a function of the temperature of said second temperature responsive means.

9. The thermostat of claim 8 including an electric heater adjacent said second temperature responsive means and adapted to be energized when said thermostat contacts are closed.

10. An improved thermostat adapted to be mounted on the inside surface of an outside wall of a space to be temperature controlled whereby the heat supplied to the space by a heat transfer medium will be controlled by said thermostat as a function of both the air temperature in said space and the temperature of the inside surface of said outside wall, said thermostat comprising a barrier in said space and spaced from outside wall, a first temperature responsive element in said space on the side of said barrier away from said wall, a second temperature responsive element between said barrier and said wall and adapted to exchange radiant energy with the inside surface of said wall, a first control circuit contact and a second control circuit contact, said contacts being adapted when contacted one by the other to initiate a temperature change in said space, means adapting said first temperature responsive element to vary the position of one of said contacts to make contact with the other of said contacts and means adapting said second temperature responsive element to vary the temperature in said space at which said contacts will open as a function of the inside temperature of said outside wall.

References Cited in the file of this patent

UNITED STATES PATENTS

| | | |
|---|---|---|
| 1,782,045 | Mason | Nov. 18, 1930 |
| 2,192,633 | Beam | Mar. 5, 1940 |
| 2,207,942 | Persons | July 16, 1940 |
| 2,306,810 | Jones | Dec. 29, 1942 |
| 2,625,239 | Senne | Jan. 13, 1953 |